US012531732B2

(12) United States Patent
Stewart et al.

(10) Patent No.: US 12,531,732 B2
(45) Date of Patent: Jan. 20, 2026

(54) METHOD AND APPARATUS FOR STORING KEYS

(71) Applicants: Advanced Micro Devices, Inc., Santa Clara, CA (US); ATI Technologies ULC, Markham (CA)

(72) Inventors: Norman Vernon Douglas Stewart, Markham (CA); Mihir Shaileshbhai Doctor, Santa Clara, CA (US); Omar Fakhri Ahmed, Markham (CA); Hemaprabhu Jayanna, Santa Clara, CA (US); John Traver, Santa Clara, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 398 days.

(21) Appl. No.: 17/956,587

(22) Filed: Sep. 29, 2022

(65) Prior Publication Data

US 2024/0113875 A1 Apr. 4, 2024

(51) Int. Cl.
*H04L 9/08* (2006.01)

(52) U.S. Cl.
CPC .................. *H04L 9/0894* (2013.01)

(58) Field of Classification Search
CPC ..................................................... H04L 9/0894
See application file for complete search history.

(56) References Cited

U.S. PATENT DOCUMENTS

| | | | |
|---|---|---|---|
| 8,625,802 B2 | 1/2014 | Parann-Nissany | |
| 9,197,410 B2 | 11/2015 | Yoshida et al. | |
| 9,258,120 B1* | 2/2016 | Allen | H04L 9/0891 |
| 9,830,278 B1* | 11/2017 | Harwood | H04L 63/061 |
| 10,263,770 B2 | 4/2019 | Miller et al. | |
| 10,521,230 B2* | 12/2019 | DeHon | G06F 9/3867 |
| 10,607,032 B2 | 3/2020 | Rodriguez De Castro | |
| 10,608,784 B2 | 3/2020 | Yanovsky et al. | |
| 10,642,522 B2 | 5/2020 | Li | |
| 11,641,276 B2* | 5/2023 | Benisty | G06F 16/23 380/277 |
| 2013/0061053 A1* | 3/2013 | Yamaguchi | H04L 9/32 713/168 |
| 2015/0143014 A1* | 5/2015 | Quach | G06F 13/32 710/308 |
| 2016/0269179 A1* | 9/2016 | White | H04L 9/0897 |
| 2016/0301671 A1* | 10/2016 | Dahlstrom | G06F 9/4401 |
| 2017/0024562 A1* | 1/2017 | Rombouts | G06F 21/52 |
| 2019/0073473 A1* | 3/2019 | VanderLeest | G06F 21/554 |
| 2020/0097682 A1* | 3/2020 | Couillard | H04L 9/0897 |
| 2020/0201786 A1* | 6/2020 | Ouziel | G06F 12/0246 |
| 2021/0226786 A1* | 7/2021 | White | H04L 9/0897 |
| 2021/0320802 A1* | 10/2021 | Visegrady | H04L 9/0897 |
| 2022/0206958 A1* | 6/2022 | LeMay | G06F 12/0831 |
| 2023/0100106 A1* | 3/2023 | Dewan | G06F 3/061 713/193 |
| 2023/0143267 A1* | 5/2023 | Shin | G06F 12/0238 |
| 2023/0269076 A1* | 8/2023 | Brandt | H04L 9/32 713/189 |
| 2024/0113875 A1* | 4/2024 | Stewart | H04L 9/0894 |

* cited by examiner

*Primary Examiner* — Harris C Wang
(74) *Attorney, Agent, or Firm* — Volpe Koenig

(57) ABSTRACT

A method and apparatus for storing keys in a key storage block includes processing a key request. A first key is allocated based upon the key request. The first key is stored in the key storage block, wherein the first key is of a first size and includes a first rule.

21 Claims, 3 Drawing Sheets

METHOD AND APPARATUS FOR STORING KEYS

BACKGROUND

A memory management module, employed by an operating system of a computing system, may provide applications with a contiguous memory space, such as a virtual memory space. The physical memory storage that supports the virtual memory space can be provided by various memory devices, either internal to the computing system (e.g., main memory) or external to it (e.g., hard disk).

In such memory modules, keys (e.g., encryption keys) may be used for secure device booting, software decryption/inscription and authentication, secure session communication with peers over standard interfaces, and content protection (e.g., digital write management) and are stored in a key storage block (KSB). Known keys may have a predetermined content and size (e.g., 32 Bytes). Further, a conventional key storage block has a fixed configuration. That is, a fixed number of keys may be stored.

BRIEF DESCRIPTION OF THE DRAWINGS

A more detailed understanding may be had from the following description, given by way of example in conjunction with the accompanying drawings wherein.

DETAILED DESCRIPTION

Figure 1:
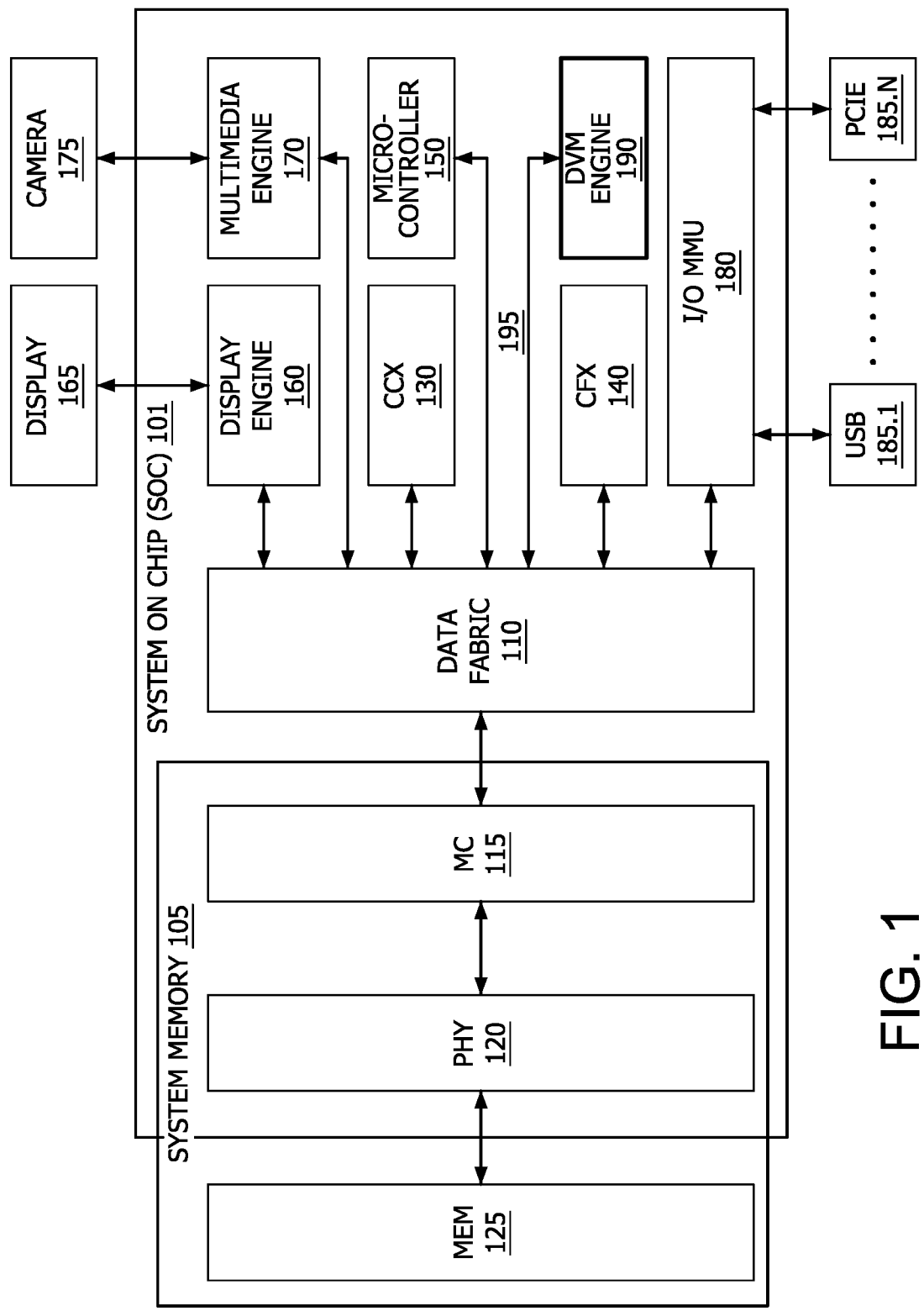
FIG. 1 is a block diagram of an example device, based on which one or more features of the disclosure can be implemented.

Systems and methods are provided for efficient management of diversified virtual memory by a diversified virtual memory (DVM) engine (also referred to herein as an engine). On behalf of a memory manager of an operating system (OS), the diversified virtual memory engine engages with various memory devices—including distributing commands to perform operations (requested by the memory manager) to the appropriate memory devices, in accordance with interface protocols required by the virtual memory managers (VMM) of the respective memory devices. The DVM engine's circuitries are configured to distribute the commands in an order that is in accordance with their respective priority levels, and to combine commands that can be parallelized.

Although further detail is provided below, aspects disclosed in the present application describe a method and apparatus for storing keys in a computer system. Generally, keys are used for device secured booting, software decryption/inscription and authentication, secure session communication with peers over standard interfaces, and content protection (e.g., digital write management).

For example, in order for a component connected to a computer system to communicate with another component, it may be necessary that the communication be secure. That is, the contents of the communication are known only to the sending component and receiving component and cannot be deciphered by another component. In such a case, a key may be utilized to encrypt the communication such that the sending component and the receiving component are provided to the key to decipher the communication, whereas a component not possessing the key will not be able to decipher the information in the communication.

Known keys typically have a predetermined content as well as a predetermined size (e.g., 32 bytes). In the present application, keys may be of software-determined sizes, and may be associated with respective rules, which are discussed below. A key size may vary from 4 bytes to 4 kilobytes (KB), for example.

Accordingly, techniques for secured management and storage of keys, replacement of keys, assigning rules associated with those keys that govern their use, and modeling export and import of keys is described. These techniques, which include management and storage of keys, may be performed in a key storage block (KSB).

The capability of allocating, deallocating and storing different sizes of keys allows for a more efficient use of memory and allows compatibility across components for generating and using keys. That is, there is no need to change hardware in order to change the size or type of the keys.

For example, in a conventional key storage technique as mentioned above, a different key storage block is required whenever a different size key is used. By utilizing a key storage technique that allows the key storage block to allocate, deallocate and store different sizes of keys, the same hardware is able to be used. Additionally, the key storage block can serve additional purposes, such as storing the associated rules for each key that are enforced when requests for key use are made.

A method for storing keys in a key storage block includes processing a key request. A first key is allocated based upon the key request. The first key is stored in the key storage block, wherein the first key is of a first size and includes a first rule.

A key storage apparatus includes a key registration block, an attribute and key storage area, and a request processor in communication with the key registration block and the key storage area. The request processor is configured to process a key request received from the key registration block, allocate a first key based upon the key request, and store the first key in the attribute and key storage area, wherein the first key is of a first size and includes a first rule.

A non-transitory computer-readable medium for storing keys in a computer system, the non-transitory computer-readable medium having instructions recorded thereon that, when executed by the processor, cause the processor to perform operations. The operations include processing a key request, allocating a first key based upon the key request, and storing the first key in the key storage block, wherein the first key is of a first size and includes a first rule.

FIG. 1 is a block diagram of an example device 100, based on which one or more features of the disclosure can be implemented. The device 100 contains a system on chip (SoC) 101, including system components such as central processing units or core complex, denoted as CCX 130 in FIG. 1, graphical processing units, denoted as GFX 140 in FIG. 1, a microcontroller 150, a display engine 160, a multimedia engine 170, an Input/Output (I/O) memory management unit (MMU) 180, diversified virtual memory engine 190, and other SoC components (not shown). The central processing core complex 130, controlled by an OS executed thereon, is configured to run applications and drivers. The graphical processing units 140 can be employed by those applications (via the drivers) to execute computational tasks, typically involving parallel computing on multidimensional data (e.g., graphical rendering and/or processing of image data). The microcontroller 150 is configured to perform system level operations—such as assessing system performance based on performance hardware counters, tracking the temperature of components of the SoC 101, and processing information from the OS. Based on data related to the system level operations, the microcontroller 150 manages the power allocation to the different components of the SoC. As disclosed herein, the diversified virtual memory engine 190 includes circuitry that is designed to provide efficient access to different types of physical memory units, for example, units that are part of the main memory and cache systems of various SoC components.

The SoC 101 further includes a data fabric 110, a memory controller (MC) 115, and a physical layer (PHY) 120 that provide access to memory (MEM) 125, e.g., consisting of DRAM units. The data fabric 110 is typically implemented by a network of switches that interconnect the SoC components 130, 140, 150, 160, 170, 180, 190 to each other and also provides the SoC components with read and write access to memory 125. The memory controller 115, the physical layer 120, and the memory 125 can be considered as parts of a system memory 105, and may each include multiple units of memory controllers, physical layers, and memory units, respectively, that may be connected to respective multiple units of data fabrics of the data fabric 110.

The device 100 of FIG. 1 can be a mobile computing device, such as a laptop. In such a case, I/O ports 185.1-N (or collectively 185) of the device—including, for example, a universal serial bus (USB) port 185.1 and a peripheral component interconnect express (PCIE) port 185.N, among other I/O ports—can be serviced by the I/O MMU 180 of the SoC 101. The display 165 of the device can be connected to the display engine 160 of the SoC 101. The display engine 160 can be configured to provide the display 165 with rendered content (e.g., generated by the graphical processing units 140) or to capture content presented on the display 165 (e.g., to be stored in memory 125 or to be delivered by the I/O MMU 180 via one of the I/O ports 185 to a destination device or server). The camera 175 of the device can be connected to the multimedia engine 170. The multimedia engine 170 can be configured to process video captured by the camera 175, including encoding the captured video (e.g., to be stored in memory 125 or to be delivered by the I/O MMU 180 via one of the I/O ports 185 to a destination device or server).

Generally, memory management is implemented by a software module employed by the operating system that runs on the core complex 130. Memory management includes, for example, translations of virtual memory addresses to physical memory addresses. Such translations depend on a device-specific protocol, that is, the interface protocol that is required by a virtual memory manager (VMM) of a physical memory device that a virtual memory address is mapped into.

The diversified virtual memory engine, as disclosed herein, can be configured to perform translations of virtual memory addresses into physical memory addresses using respective device-specific protocols. Thus, rather than have the operating system directly and discretely manage memory spaces of different target memory devices, the diversified virtual memory engine can be configured to take over such functionality.

In such a case, the diversified virtual memory engine directly interacts with various implementations of virtual memory mappings, according to respective protocols, and accelerates operations that are typically involved in memory management—including data allocation, data deletion, data migration (to resolve fragmented memory), as well as cache invalidation and flashing.

Figure 2:
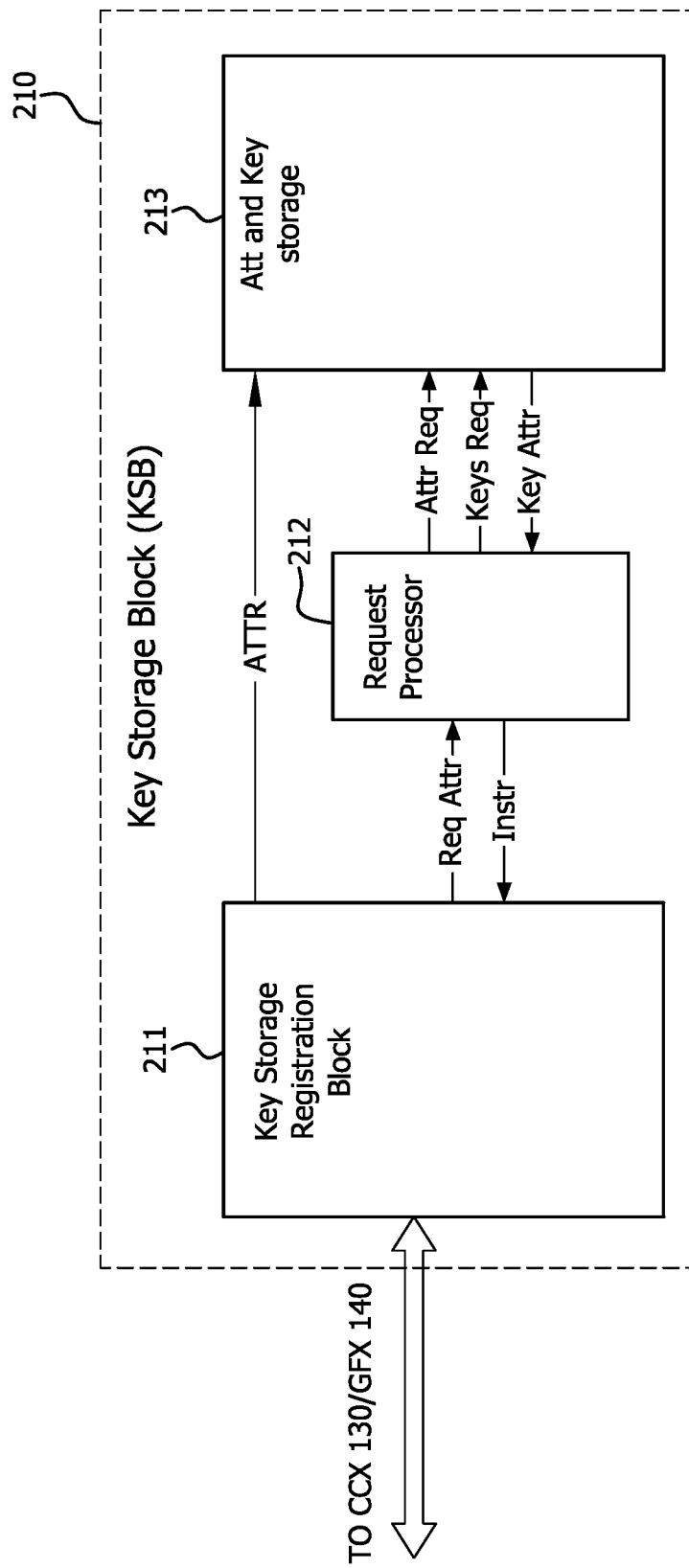
FIG. 2 is a block diagram of an example key storage block, based on which one or more features of the disclosure can be implemented.

FIG. 2 is a block diagram of an example key storage block 210, based on which one or more features of the disclosure can be implemented. The key storage block 210 includes various components, which may be circuitry, software, or software controlled components. For example, the key storage block 210 includes a key storage registration block 211, a request processor 212, and an attribute (Attr) and key storage area 213.

The key storage registration block 211 receives key requests from components requiring a key. Requests may include a request to use a key for communication, a request to write a key to the key storage block 210, or a request to deallocate a key from the key storage block, for example. The key storage registration block 211 is in communication with the request processor 212, which makes determinations relating to key requests. That is, the request processor 212 receives the key requests from the key storage registration block 11, may buffer the requests, process the key requests, and report back rules and attributes associated with the keys to the key storage registration block 211.

For example, the key storage registration block 211 may be in communication with various components of the SoC 101 to communicate information relating to key use. That is, a component requiring a key, such as the USB 185.1 or PCIE 185.N, or a virtual machine connected to the system 100, may be in communication with the key storage registration block 211 via the core 130 or the graphical processing units 140. However, it should be noted that the key storage registration block 211 may be in communication with other components to receive key requests and communicate information relating to key use.

The key storage registration block 211 may be in communication with the core complex 130 or the graphical processing units 140 to receive information relating to requests from components for key use. and the key storage registration block 211 may communicate the request for a key as well as attributes or rules associated with the key (Req Attr) to the request processor 212.

In addition, the key storage registration block 211 may allocate or deallocate keys, perform reads and writes of keys, and enforce the rules associated with the keys. For example, when a component (e.g., PCIE 185.N or a virtual machine) requests a key, once the key request is processed, the key storage registration block 211 may allocate the key to the component that is requesting the key. When the component no longer requires the key, the key storage registration block 211 deallocates that key for that component. Thus, keys may be generated and provided by the key storage registration block for use by a requesting component, and then deallocated (e.g., destroyed/removed from use) when the component no longer requires use of the key.

As described above, the key storage registration block 211 is in communication with the request processor 212 and informs the request processor 212 of key requests. The request processor 212 then processes the requests and instructs the key storage registration block 211 to act accordingly. For example, the request processor 212 receiving the key request from the key storage registration block 211 determines whether the request for the key violates a rule.

For example, a rule may dictate that the associated key being requested can only be used as a key, but not be read out of or written into the attribute and key storage area component 213 with respect to attributes and keys. If a requester (e.g., requesting component) attempts to violate a rule, the request processor 212 may decide whether such a violation justifies interrupting the core 130, or other host component, to report the violation. In the event that a violation of a rule occurs, the request processor 212 communicates the violation information to the key registration block 211, which communicates with, for example, the core complex 130 to report the violation. In addition, as described below, the request processor 212 denies the request.

The request processor 212 communicates with the attribute and key storage area 213 to store, or write, requested keys (e.g., keys req signal) and attributes relating to the key requests (e.g., attr request signal). In addition, the request processor reads keys from the attribute and key storage area 213 (key attr signal). The request processor 212 may store keys of varying sizes and keys that include different rules in the attribute and key storage area 213. Accordingly, for keys whose rules allow the key to be stored in the attribute and key storage area 213, those keys are written into the attribute and key storage area 213 by the request processor 212.

In this manner, the attribute and key storage area 213 receives information from the request processor 212 to store keys and attributes relating to those keys. The memory storage area in the attribute and key storage area 213 can be configured and reconfigured based on the size and type of the key.

For example, as discussed above, a key having a 4 byte key size may be stored in the attribute and key storage area 213. In addition, a key having a key size of 4 KB may also be stored in the attribute and key storage area 213 by the request processor 212. That is, keys of different sizes may be stored in the same attribute and key storage area 213 by the request processor 212. Further, keys having different rules (e.g., whether a key may be written by a component or only used) may additionally be stored by the request processor 212 in the attribute and key storage area 213. The attribute and key storage area 213 also may receive information from the key storage registration block 211, such as the attribute information of a key once the request processor 212 has processed a key request.

Figure 3:
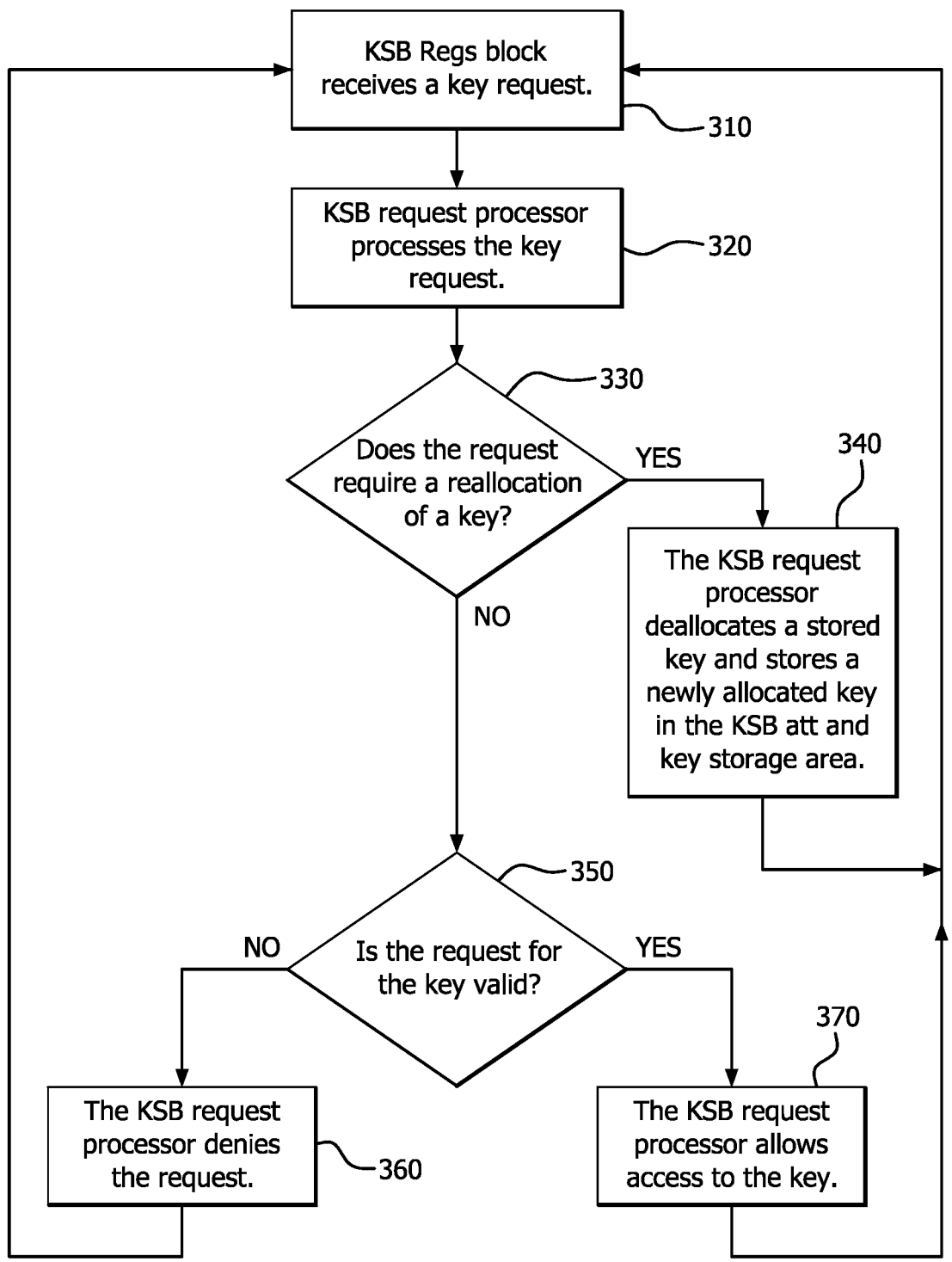
FIG. 3 is a flowchart of an example method for storing keys, based on which one or more features of the disclosure can be implemented.

FIG. 3 is a flowchart of an example method 300 for managing keys, based on which one or more features of the disclosure can be implemented. In step 310, the key registration block 211 receives a key request. For example, the request could be for the use of a key or to store a new key. As mentioned above, the key registration block 211 may receive the key request from a component such as the PCIE 185.N or a virtual machine connected to the system 100. The key request includes attributes for the key being requested which may include key size as well as rules governing the use of the key.

The key registration block 211 forwards the request to the request processor 212 to process the request. The request processor 212 then processes the request received by the key registration block 211 by determining what action is to be taken upon receipt of the key request (step 320). That is, the request processor determines whether the request is for a key to be created or requires reallocation of an existing key (step 330).

For example, if the request is for key to be created or a reallocation of a key (step 330), the request processor 212 deallocates a stored key in the attribute and storage area 213. That is, the request processor 212 may destroy the existing key that has been allocated for use for a requesting component. In addition, the rules and attributes for that key are destroyed by the request processor 213 (step 340). In this manner, the key cannot then be used by the component that originally used the key.

Further, in step 340, if the request from the component requires reallocation of a key (e.g., the creation of a new key for a component that was destroyed previously) in step 330, the request processor 212 allocates and stores the newly allocated key as well as the attributes of the newly allocated key in the attribute and storage area 213. That is, the request processor 212 communicates with the attribute and storage area 213 to send a new key for storage in the attribute and storage area 213. In addition, the attribute and storage area 213 may store the attribute and rule information about key received from either the request processor 212 or from the key registration block 211.

Accordingly, the request processor 212 can destroy a key in the attribute and key storage area 213 and reallocate an area for a new key. The new key may be of a different size than the key previously stored in the key storage area 213.

In this manner, different size keys can be allocated and stored in the key storage block 210. As mentioned above, for example, both a 4 byte key and a 4 KB key in the attribute and key storage area 213. Additionally, the request processor 212 can store attribute and rule information relating to any key stored in the attribute and key storage area 213.

If the request in step 330 does not require the reallocation of a key, the request processor 212 determines if the request for the key is valid (step 350). For example, as mentioned above, the key request may violate a rule, rendering the request invalid. That is, the request may be a request to write a key to the attribute and key storage area 213 by a component (e.g., PCIE 185.N or a virtual machine) that is only permitted to be used, but not written to the attribute and key storage area 213 by that component. In this case, the request processor 212 may determine that the request for the key is invalid. Additionally, another example may include a request for a key that has been destroyed may be deemed an invalid request for the key.

If it is determined by the request processor 212 that the request for the key is not valid in step 350, the request processor 212 denies the request for the key to the requesting component (step 360) and may take additional action. For example, if the request violates a rule for the key, the request processor 212 may decide whether such violation justifies interrupting the core 130 (host) to report the violation.

In the example above, where the request for the key includes an attempt to write a key to the attribute and storage area 213, and the rule for that key only allows use of the key but disallows the component requesting the key to be written to the attribute and storage area 213, the request processor 212 may deem the request invalid. In this case, the request processor may communicate to the registration block 211 that the requesting component attempted to violate a rule. The registration block 211 may then communicate with, for example, the core complex 130 and inform the core complex 130 of the violation. The core complex 130 may then take action regarding the requesting component such as denying the requesting component access to secure communication, for example.

However, if the request for the key is valid, the request processor 212 allows access to the key (step 370). For example, the request processor 212 may read the key requested from the attribute and key storage area 213 and provide the key to the key registration block 211. The key registration block 211 may then provide the key through the system (e.g., via the core complex 130) to the requesting component.

In this manner, keys and associated rules can be dynamically modified (replaced) by a secured management system allowing dynamic change of use of keys by secure key consumer's clients. Accordingly, a virtual machine, or component such as PCIE 185.N, may be provided access to keys that may be of different sizes and include different attributes and rules. Further, the key storage is secure as the request processor 212 determines validity and permits key requests via the key registration block 211.

An example application of the above method may include a series of identical virtual machines each running some applications that require a use of a key. Utilizing the above method, all these keys can be imported into the key storage block 210 and a virtual machine may ask to use a key for an application.

In such a case, an associated rule indicates whether the requesting virtual machine or requesting component can use the key for the indicated purpose. So multiple entities (such as multiple virtual machines or components such as PCIE 185.N) can consume keys from the key storage block 210 if permitted. A central security resource can import keys to the secured key management resource (i.e., key storage block 210) so external clients can request to use these keys according to associated rules.

The above apparatus and methods may reside in a server SoC 101 that serves a number of client devices connected either by a wired, wireless, or other connection (e.g., Internet connection). The above method and apparatus allows for keys with different sizes to be allocated and reused, and multiple keys of different sizes and/or with different rules can be stored in a same area, (e.g., attribute and storage area 213 of FIG. 2). Although not shown in FIG. 1, the key storage block 210 may be located in the SoC 101 adjacent to the core complex 130 or anywhere resident in the SoC 101.

It should be understood that many variations are possible based on the disclosure herein. Although features and elements are described above in particular combinations, each feature or element can be used alone without the other features and elements or in various combinations with or without other features and elements. For example, although a particular ordering of steps is described above, this ordering is not necessarily required. For example, a check for validity could precede or occur simultaneously with a check for whether the key requires reallocation.

The methods provided can be implemented by SoC components (of FIG. 1) in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such as instructions capable of being stored on a computer readable media). The results of such processing can be mask works that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general-purpose computer or a processor or hardware finite state machines. Examples of a non-transitory computer-readable medium include read only memory (ROM), random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for dynamic key management that improves memory utilization, the method comprising:
   receiving-a key request by a systems on a chip (SoC),
   dynamically configuring, within an attribute-and-key storage area of a key storage block, a variable-length memory segment of a desired key size;
   allocating a first key based upon the key request;
   storing the first key together with at least one rule in the variable-length memory segment; and
   interrupting a processor core of the SoC when a subsequent request to use or modify the first key does not satisfy the at least one rule.

2. The method of claim 1, further comprising storing a second key in the key storage block, wherein the second key is of a second size and includes a second rule.

3. The method of claim 1, wherein upon the key request including a request to deallocate a stored key, further comprising deallocating the stored key and a rule associated with the deallocated key.

4. The method of claim 1, further comprising:
   processing the key request based upon a validity of the key request, and
   denying the key request based upon the key request being invalid.

5. The method of claim 4, further comprising storing of the first key in the key storage block is based upon the key request being valid.

6. The method of claim 4, wherein an invalid key request includes a request that violates the at least one rule.

7. The method of claim 1 wherein a first key request is received from a first component and a second key request is received from a second component.

8. An apparatus for dynamic key management that improves memory utilization, the apparatus comprising:
   a core complex;
   a key registration block;
   an attribute and key storage area; and
   a processor in communication with the key registration block and the key storage area, the processor configured to:
   receive a key request,
   allocate a first key based upon the key request,
   dynamically configure, within the attribute-and-key storage area of a key storage block, a variable-length memory segment of a desired key size
   store the first key together with at least one rule in the variable-length memory segment; and
   interrupt a processor core of the core complex when a subsequent request to use or modify the first key does not satisfy the at least one rule.

9. The apparatus of claim 8, wherein the processor is further configured to:
   store a second key in the attribute and storage area, wherein the second key is of a second size and includes a second rule.

10. The apparatus of claim 8, wherein upon the key request including a request to deallocate a stored key, the processor is further configured to:
    deallocate the stored key and a rule associated with the deallocated key.

11. The apparatus of claim 8, wherein the processor is further configured to:
   process the key request based upon a validity of the key request.

12. The apparatus of claim 11, wherein the processor is further configured to:
   store the first key in the attribute and the key storage area based upon the key request being valid, and
   deny the key request based upon the key request being invalid.

13. The apparatus of claim 12, wherein an invalid key request includes a request that violates the rule.

14. The apparatus of claim 8 wherein a first key request is received by the key registration block from a first component and a second key request is received from a second component.

15. A non-transitory computer-readable medium storing instructions for dynamic key management that improves memory utilization, the instructions when executed by a processor of a systems on a chip (SoC), cause the processor to perform operations including:
   receiving a key request;
   dynamically configuring, within an attribute-and-key storage area of a key storage block, a variable-length memory segment of a desired key size;
   allocating a first key based upon the key request;
   storing the first key together with at least one rule in the variable-length memory segment; and
   interrupting a processor core of the SoC when a subsequent request to use or modify the first key does not satisfy the at least one rule.

16. The method of claim 1, further comprising:
   denying the subsequent request to use or modify the first key when the subsequent request does not satisfy the at least one rule.

17. The apparatus of claim 8, wherein the processor is further configured to:
   deny the subsequent request to use or modify the first key when the subsequent request does not satisfy the at least one rule.

18. The method of claim 1, wherein the key request is received from a component that is external to the SoC.

19. The apparatus of claim 8, wherein the key request is received from a component that is external to the SoC.

20. The method of claim 1, wherein the key request-specifies the desired key size and the at least one rule governing use of a key.

21. The apparatus of claim 9, wherein the key request specifies the desired key size and the at least one rule governing use of a key.

* * * * *